(12) United States Patent
He (10) Patent No.: US 8,725,835 B2
(45) Date of Patent: May 13, 2014

(54) METHOD AND WEB SERVER FOR IMPLEMENTING WEB ACCESS

(75) Inventor: Kun He, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/502,293

(22) PCT Filed: Dec. 22, 2011

(86) PCT No.: PCT/US2011/066805
§ 371 (c)(1),
(2), (4) Date: Apr. 16, 2012

(87) PCT Pub. No.: WO2012/092118
PCT Pub. Date: Jul. 5, 2012

(65) Prior Publication Data
US 2013/0275551 A1    Oct. 17, 2013

(30) Foreign Application Priority Data

Dec. 31, 2010   (CN) .......................... 2010 1 0617580

(51) Int. Cl.
G06F 15/16    (2006.01)
(52) U.S. Cl.
USPC ....................................... 709/217
(58) Field of Classification Search
USPC ....................................... 709/217
See application file for complete search history.

(56) References Cited

U.S. PATENT DOCUMENTS

| | | |
|---|---|---|
| 6,915,454 B1 | 7/2005 | Moore et al. |
| 7,437,710 B2 | 10/2008 | Bau, III et al. |
| 7,444,590 B2 | 10/2008 | Christian et al. |
| 7,900,186 B2 * | 3/2011 | Lucassen et al. ............. 717/104 |
| 2002/0078191 A1 | 6/2002 | Lorenz |
| 2002/0105550 A1 | 8/2002 | Biebesheimer et al. |
| 2003/0084059 A1 | 5/2003 | Kelley et al. |
| 2004/0046789 A1 | 3/2004 | Inanoria |
| 2004/0133898 A1 | 7/2004 | Cherdron et al. |
| 2004/0143815 A1 | 7/2004 | Cherdron et al. |
| 2005/0144174 A1 | 6/2005 | Pesenson et al. |
| 2005/0257138 A1 | 11/2005 | Chory et al. |
| 2006/0020883 A1 | 1/2006 | Kothari et al. |
| 2006/0106897 A1 | 5/2006 | Sapozhnikov et al. |

(Continued)

OTHER PUBLICATIONS

PCT Search Report and Written Opinion mailed Apr. 10, 2012 for PCT application No. PCT/US11/66805, 7 pages.

*Primary Examiner* — Larry Donaghue
(74) *Attorney, Agent, or Firm* — Lee & Hayes, PLLC (57) ABSTRACT

Implementing Web access includes finding a Web module and a Web module method associated with a client request. Based on a parameter declaration of the Web module method, a Web server obtains from a Web context request data that is used to invoke the Web module method. The Web server then stores in a Web context a return value and renders a displayed Web page based on the Web context. In some aspects, implementing Web access further includes analyzing the parameter declaration of the Web module methods and finding a data scope and a data item associated with the request data. In some aspects, implementing Web access further includes generating a Web module instance in response to determination that the instance does not exist.

20 Claims, 6 Drawing Sheets

(56) References Cited

U.S. PATENT DOCUMENTS

| | | |
|---|---|---|
| 2006/0184887 A1 | 8/2006 | Popp et al. |
| 2007/0214408 A1 | 9/2007 | Straub et al. |
| 2008/0120343 A1 | 5/2008 | Altrichter et al. |
| 2008/0307299 A1 | 12/2008 | Marchant et al. |
| 2008/0313008 A1* | 12/2008 | Lee et al. ................... 705/10 |
| 2009/0313609 A1* | 12/2009 | Ackerman et al. ............ 717/127 |
| 2012/0023395 A1* | 1/2012 | Pieczul et al. ................ 715/234 |
| 2012/0143570 A1* | 6/2012 | Austin et al. ..................... 703/1 |
| 2012/0174062 A1* | 7/2012 | Choi et al. .................... 717/108 |
| 2012/0304069 A1* | 11/2012 | Zhang et al. .................. 715/730 |

\* cited by examiner

METHOD AND WEB SERVER FOR IMPLEMENTING WEB ACCESS

CROSS REFERENCE TO RELATED PATENT APPLICATIONS

This application is a national stage application of an international patent application PCT/US11/66805, filed Dec. 22, 2011, which claims priority to Chinese Patent Application No. 201010617580.0, filed on Dec. 31, 2010, entitled "METHOD AND WEB SERVER FOR IMPLEMENTING WEB ACCESS," which applications are hereby incorporated by reference in their entirety.

TECHNICAL FIELD

The present disclosure relates to the field of Web technology. More specifically, the disclosure relates to methods and Web servers for implementing Web access.

BACKGROUND OF THE PRESENT DISCLOSURE

To implement Web access, a client sends a request to a Web server that processes the request. In response, a corresponding Web module of the Web server generates response information that is sent back the client to enable the Web access. A Web module is a program unit having a particular function in a Web server.

Currently, more and more Web development environments support Model-View-Controller (MVC) for depicting application program structures as well as functions and interactions within the structures. Under MVC, the model manages data packing. The view renders the model into display pages and, particularly, implements data input/output functions. And, the controller completes application logic.

In these environments, a Web server may obtain request data and provide response data through instance variants after receiving a client request. However, a problem may occur when a Web module of the Web server implements many different methods. This is because, for example, request data and response data associated with individual methods of the Web module must be assigned to an instance variant. These methods, however, do not describe or specify different data (e.g., the request data and response data). Accordingly, the Web server may spend more time in responding to the client request. As a result, efficiency and performance of the Web server may be impaired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure provides methods and servers, for example, to implement Web access. In some aspects, implementing Web access includes finding a Web module method corresponding to a client request. Based on a parameter declaration included in the Web module method, request data corresponding to the client request is obtained from a Web context. The Web module method is then invoked using the request data as an input parameter to obtain a return value. The return value is stored in the Web context based upon which a Web page is rendered. In some aspects, implementing Web access further includes analyzing the parameter declaration of the Web module methods and finding a data scope and a data item associated with the request data. In some aspects, implementing Web access further includes generating a Web module instance corresponding to the client request in response to determination that the instance does not exist.

BRIEF DESCRIPTION OF THE DRAWINGS

The Detailed Description is described with reference to the accompanying figures. The use of the same reference numbers in different figures indicates similar or identical items.

DETAILED DESCRIPTION

The detailed description of a method of and server for web access is set forth with reference to the accompanying figures.

This disclosure describes methods and systems for distinguishing request data from response data associated with instance variants, providing corresponding parameter descriptions in Web module methods, and increasing efficiency and performance of Web modules.

For instance, in a Model-View-Controller (MVC) design model, to implement Web access, a Web server receives a client request and finds a corresponding Web module based on requested functions (i.e., a Web module to process login request if the client submits a login request). Then, a Web module instance and a corresponding instance variant are created. The instance variant is created to cache request data and response data that are associated with the client request. The Web server assigns the request data to the instance variant, invokes an instance of a method of the Web module, caches a return value (i.e., the response data associated with the client request) to the instance variant, and finally renders a Web page based on the instance variant. The request data and its corresponding response data are stored in a Web context in the Web server for exchanging data between different Web modules.

The technologies described below, meanwhile, allow implementing Web access more efficiently and accurately than when compared with existing technologies. To do so, a parameter declaration and a corresponding return parameter declaration are pre-set in a Web module method. The parameter declaration indicates a source of request data that is obtained from a Web context in response to a client request. The return parameter declaration indicates a certain scope of the Web context in which a return value is stored after invoking the Web module method and obtaining the return value. Accordingly, the Web server can efficiently and accurately identify attributes of the request data and process the request data that is obtained from the Web context data corresponding to the client request. Meanwhile, the Web server can efficiently and accurately locate a cache storing the return value in the Web context, therefore reducing processing steps and increasing efficiency and performance of the Web server.

Figure 1:
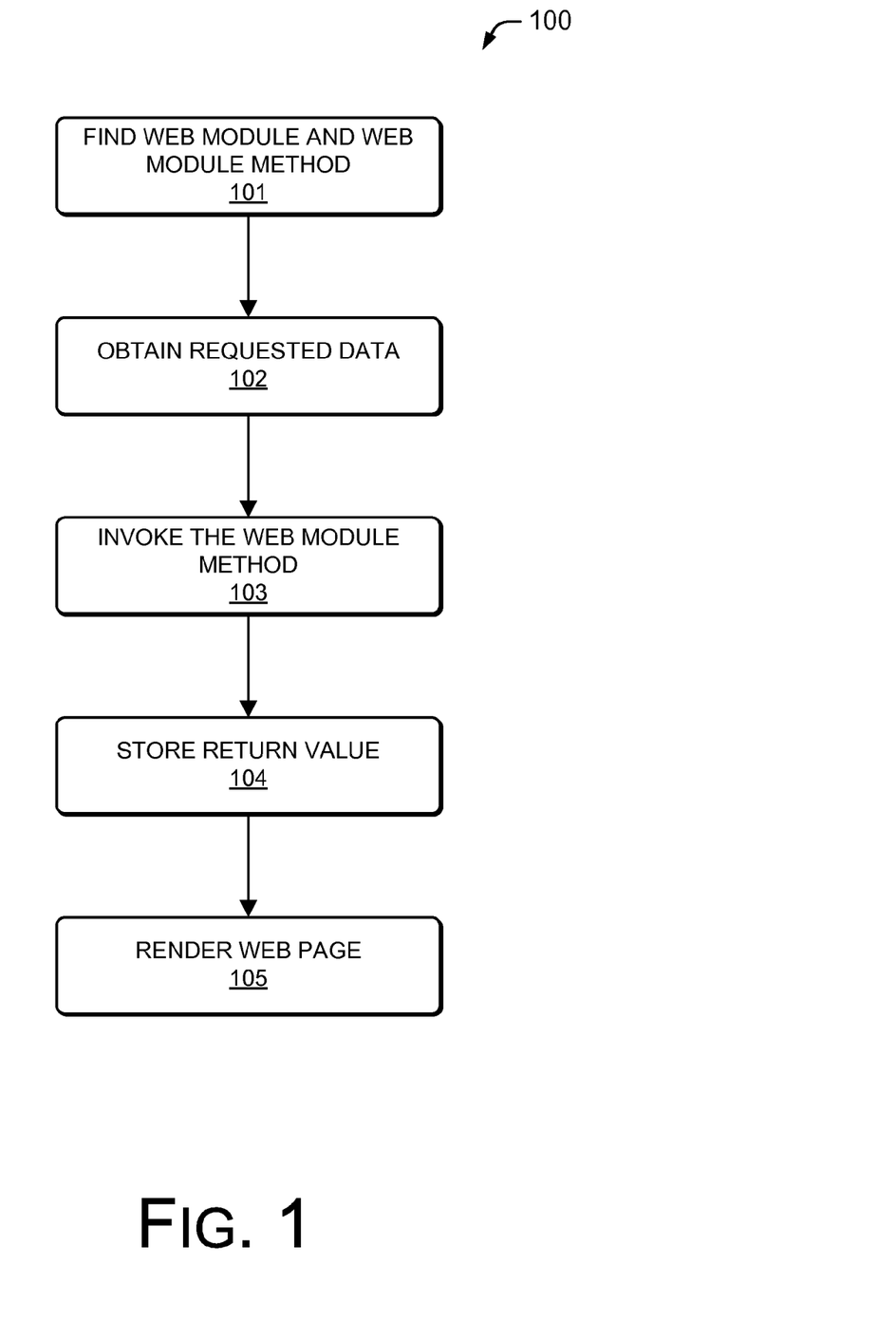
FIG. 1 is a flowchart showing an exemplary process of implementing Web access.
Figure 2:
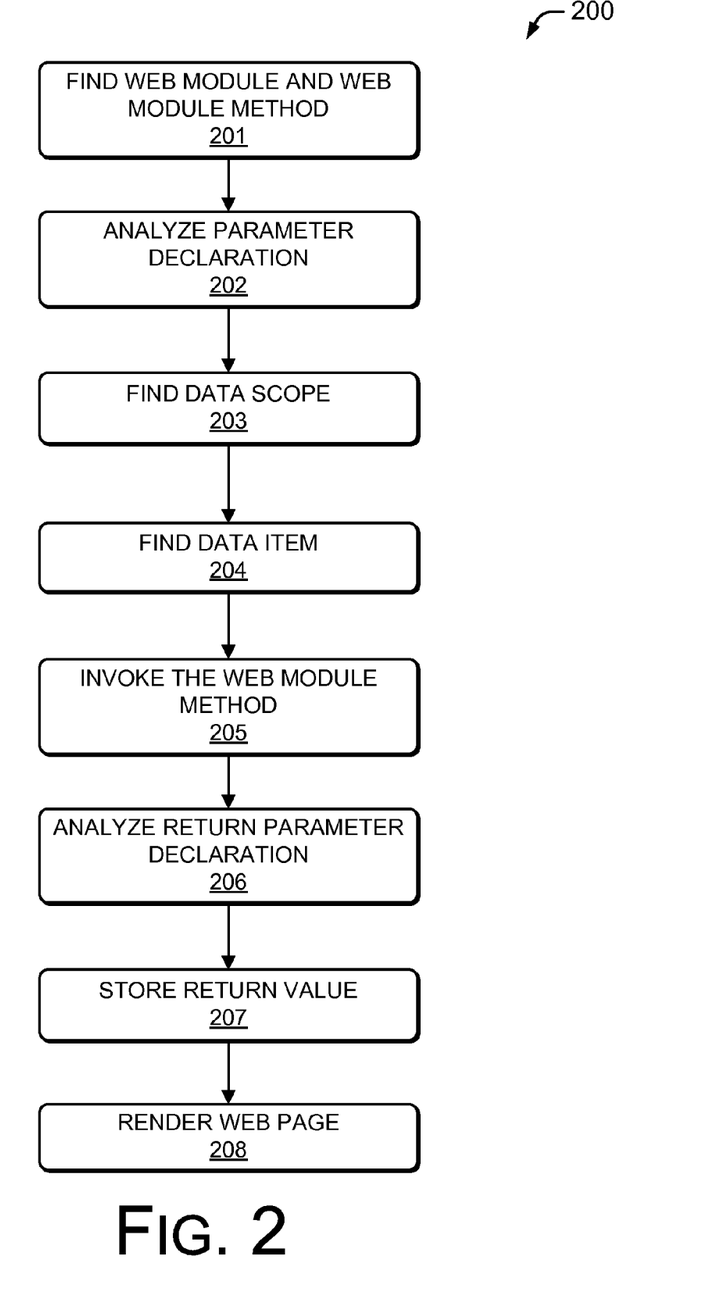
FIG. 2 is a flowchart showing another exemplary process of implementing Web access.
Figure 3:
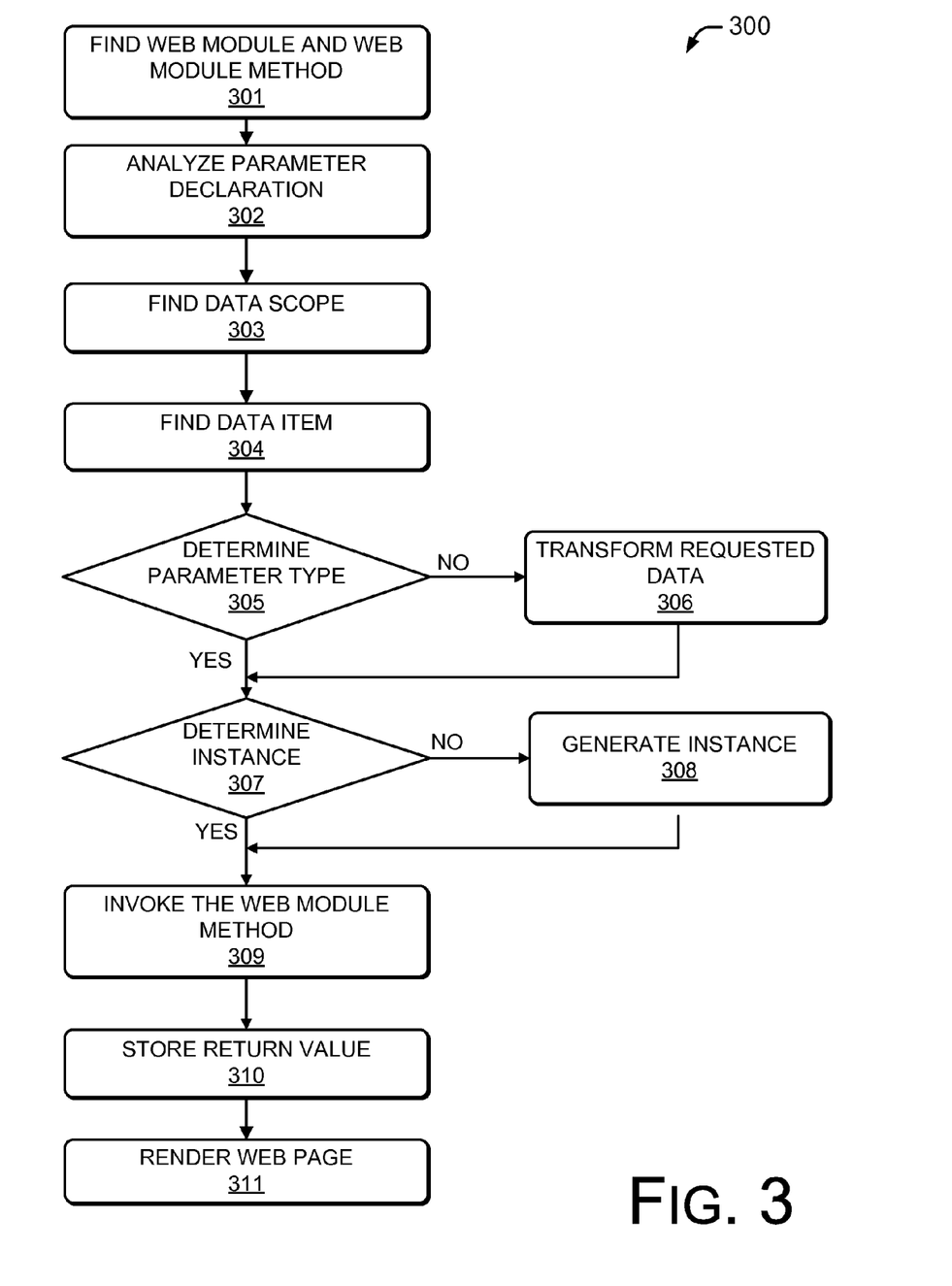
FIG. 3 is a flowchart showing yet another exemplary process of implementing Web access.

FIGS. 1-3 are flowcharts showing exemplary processes of implementing Web access. The processes are illustrated as a collection of blocks in logical flowcharts, which represent a sequence of operations that can be implemented in hardware, software, or a combination. The processes may be performed using various environments and devices.

For ease of understanding, the methods 100, 200 and 300 are delineated as separate steps represented as independent blocks in FIGS. 1, 2 and 3. However, these separately delineated steps should not be construed as necessarily order dependent in their performance. The order in which the process is described is not intended to be construed as a limitation, and any number of the described process blocks may be combined in any order to implement the method, or an alternate method. Moreover, it is also possible that one or more of the provided steps may be omitted.

FIG. 1 is a flowchart showing an exemplary process of implementing Web access. At 101, a Web server finds a Web module and Web module method corresponding to a received client request. In some embodiments, the Web server finds the Web module that processes the client request based on the Uniform Resource Locator (URL) of the client request, and the Web module contains corresponding application methods (i.e., Web module methods). For example, if the Web server detects that the client request is an order request, the Web server finds the Web module that processes orders. A Web module varies based on different applications indicated by client requests. In some embodiments, a Web module method indicates behavior of a certain Web module.

At 102, the Web server obtains request data corresponding to the client request from a Web context based on a parameter declaration of the Web module method. In some embodiments, the Web module method contains a parameter declaration, and the Web server may obtain from the Web context the request data based on the parameter declaration of the Web module method. The parameter declaration may be pre-set in the Web module method, and this pre-set parameter declaration indicates a source of the request data that is obtained from the Web context in response to the client request. In some embodiments, the parameter declaration may indicate existence of the request data with respect to the content. More detailed description is provided below.

A Web context is a storage unit of the Web server and may be divided into several scopes based on functions and data types. The data within different scopes has different visibilities for different Web modules. For example, "Parameter" scope stores data submitted by a current client request; "Request" scope stores data shared by different Web modules during the time from requesting by a client to the end of the response of the Web server; "Cookie" scope intercepts and/or stores client cookie data shared by current users of multiple requests; "Session" scope intercepts and/or stores data shared by the current users of multiple requests; and "Application" scope intercepts and/or stores data shared by all online users during operation of the Web server.

At 103, the Web server invokes the Web module method by using the request data as an input parameter of the Web module method. In some embodiments, the request data obtained at 102 is used as an input parameter of the Web module method, and the Web module method found at 101 is invoked to obtain a return value: response data after the Web server responds to the client request.

At 104, the Web server stores in the Web context the return value based on a return parameter declaration of the Web module method. The Web module method contains a return parameter declaration in addition to the parameter declaration. The return parameter declaration indicates a certain scope of the Web context in which a return value is stored after the Web module method is invoked and the return value is obtained. Accordingly, after invoking the Web module methods, the Web server stores the return value in the Web context based on the certain scope indicated by the return parameter declaration.

At 105, the Web server renders the return value of the Web context as a Web page that is subsequently displayed to the client. Other modules of the Web server obtain the return value from the Web context, render the return value as a Web page, and display the page on the client.

In some embodiments, the Web module is a controller and its corresponding Web module method is a controller function in a MVC design model as the Web module processes client requests. For example, suppose that the client request is a login request. As a result, a corresponding controller is found based on a URL corresponding to a user's login page, and the controller has a corresponding function of login behavior. Accordingly, technologies described in this disclosure may be applied to a MVC design model. The Web module is a controller; the Web module method is a function; and the process of the controller and the controller function are consistent with the technologies.

FIG. 2 is a flowchart showing another exemplary process of implementing Web access. At 201, a Web server finds a Web module and Web module method corresponding to a received client request. At 202, the Web server analyzes a parameter declaration of the Web module method to obtain a parameter annotation and a parameter annotation attribute. The parameter annotation indicates a data source of request data in a Web context, and the parameter annotation attribute indicates a data item of the request data in the data source.

In some embodiments, conventional annotation technologies can be employed for pre-setting the parameter declaration and a return value declaration of the method. The reflection technique can be used for analyzing the parameter declaration and the related return value declaration to obtain the parameter annotation and the parameter annotation attribute.

In some embodiments, the parameter declaration and the return parameter declaration of a Web module method indicate request data, an input binding logic, a return value and an output binding logic. For example, a pre-set Web module method may be implemented as an object-oriented programming language (e.g., Java) provided as follows.

---

Public [ReturnAnnotation] ReturnType MethodName (
[Annotation1(annotationProperty) Type1 Argument1,
Annotation2(annotationProperty) Type2 Argument2,
...
AnnotationN(annotationProperty) TypeN ArgumentN]
)

---

MethodName indicates a name of the application method; Annotation1 indicates a parameter annotation which indicates a data source of request data; annotationProperty indicates a parameter annotation attribute and represents a data item of a request parameter; Argument 1 indicates a name of the request parameter which in general does not involve a binding analyzing logic, but can be used to indicate the data item of the request data when annotating the attribute is available. Based on various applications processed by the method, none of or multiple parameters can be designed to indicate the request data. For example, Argument2, . . . ArgumentN indicate N parameter declarations. Type1 indicates a parameter type that may be included in the formal parameter declaration, indicating a data type for the request data.

ReturnAnnotation indicates the return parameter annotation included in the return parameter declaration of the method, indicating where the return value is stored in the Web context. ReturnType indicates a return parameter type that may be included in the return parameter declaration for indicating the data type of the return value.

In some embodiments, some or all attributes of a parameter declaration or a return parameter declaration can be omitted (i.e., a Web module method without a parameter annotation or a return parameter annotation). In this situation, the Web server analyzes the parameter declaration or the return parameter declaration, and adopts default attributes of the parameter declaration or the return parameter declaration. For example, if there is no parameter annotation, default request data is data that is currently submitted by the client. The parameter annotation and the return parameter annotation may be represented by [ . . . ], indicating the omission. In other words, the Web module method may have neither parameter annotation nor return parameter annotation.

At 203, the Web server finds in the Web context a data scope corresponding to the request data based on the parameter annotation. For example, if a parameter annotation is "@parameter", the annotation indicates that the request data is data currently submitted by the client; the Web server may locate the request data in the scope of "parameter" in the Web context. Similarly, "@request" indicates that the request data is located in the scope of "request" in the Web context; "@session" indicates that the request data is located in the scope of "session" in the Web context.

In some embodiments, the parameter declaration does not have the parameter annotation. In this situation, the Web server adopts default data source information of the Web module method. For example, the parameter declaration is represented as "public Boolean login (String username, String password)" and has no parameter annotation. As a result, the data request may be located in the scope of parameter in the Web context, namely the request data currently submitted by the client; the corresponding data items may be represented as "username" and "password".

In some embodiments, the request data can be located in different scopes of the Web context; the request data can be data currently submitted or stored in the Web server and related to the current client request.

At 204, the Web server finds in the data scope of the Web context the data item corresponding to the client request based on the parameter annotation attribute. Suppose that "uname" is pre-set as a parameter annotation attribute indicating HTTP parameter submitted by the client; "String" is pre-set as a parameter type indicating that the type of the request data is a string; "username" is pre-set as a name of the parameter indicating the login user name; and "Boolean" is pre-set as a return value of the Web module method indicating whether the login succeeds. If the parameter annotation attribute ("uname") is omitted, the aforementioned parameter "username" substitutes. As a result, a parameter declaration may be represented as: public Boolean login(String username, String password).

In some embodiments, the parameter annotation may indicate that the request data is data currently submitted; "uname" and passwd" may represent the parameter annotations corresponding to the stored request data, indicating the data item stored in the currently submitted data. For example, if a user types a user name and/or a password in a corresponding input box on a login page, the user name and/or the password correspond to data items (e.g., "uname" and "password"). In other words, the user name and the password may be stored in the data items "uname" and "passwd" respectively.

For example, suppose that a registration method (register) includes a parameter declaration "@Parameter('user')". As a result, the declaration indicates that data named as "user" is to be obtained from HTTP parameter. The parameter type is "User" indicating that the request data obtained from the Web context by a Web frame of the Web server has to satisfy structural requirements of type "user". To obtain the "user" request data based on "user" attributes, the HTTP parameters submitted by the client may include a parameter value of "user" annotation and each name of the attributes. A HTML code for the example above may be represented as: <input name="user.username"> <input name="user.passwod"> <input name="user.email">. Similarly, QueryString format parameter may be represented as: userusername= Jacky&user.password=123456&useremail=jacky@abc.com. As a result, the request data obtained from the Web context is Jacky, 123456 and jacky@abc.com.

At 205, the Web server invokes the Web module method by using the request data as an input parameter of the Web module method. At block 206, the Web server analyzes the return parameter declaration to obtain a return parameter annotation that indicates a scope of the Web context corresponding to the return value. After obtaining the return value, the return parameter annotation of the return parameter declaration may be obtained. The return parameter annotation indicates a scope of the Web context where the return value will be stored.

In some embodiments, the return parameter declaration may include the return parameter type that indicates a type of the request data. For example, the return parameter declaration may be pre-set as: public @session("click Times") int click( ) "click" as a method name indicates a click operation, and "@session("click Times")" as a return parameter annotation indicates a variant of "click Times" stored in the scope of session of the Web context. "Int" as a return parameter type indicates the return value type of the method.

In some embodiments, there is no return parameter declaration (e.g., using a "void" keyword declaration). As a result, the Web module does not need to output data to the client. Accordingly, after invoking the Web module method, the Web module returns to the client directly (i.e., public void int click ( )).

At 207, the Web server stores the return value in the Web context based on the return parameter annotation. At 208, the Web server renders the return value of the Web context a Web page.

FIG. 3 is a flowchart showing an exemplary process of implementing Web access. At 301, a Web server finds a Web module and Web module method corresponding to a received client request. At 302, the Web server analyzes a parameter declaration of the Web module method to obtain a parameter annotation and a parameter annotation attribute. The parameter annotation indicates a data source of request data in a Web context, and the parameter annotation attribute indicates a data item of the request data in the data source. In some embodiments, the Web server not only analyzes the parameter declaration to obtain the parameter annotation and the parameter annotation attribute, but also analyzes the obtained parameter type that indicates a data type for the request data. For example, the parameter type may be represented as "int" indicating integer data or "string" indicating that the request data is a string.

At 303, the Web server finds in the Web context a data scope corresponding to the request data based on the parameter annotation. At 304, the Web server finds in the data scope of the Web context the data item corresponding to the client request based on the parameter annotation attribute.

At 305, the Web server determines whether the parameter type and an actual type of the request data are consistent. If these two types are inconsistent (i.e., the "No" branch from 305), at 306, the request data is converted from the actual type to the parameter type based on a pre-determined rule (i.e., "parameter binding"). If these two types are consistent (i.e., the "Yes" branch from 305), the process proceeds directly to 307.

At 307, the Web server determines whether an instance exists in the Web component method corresponding to the client request. If the instance does not exist (i.e., the "No" branch from 307), at 308, the Web server generates a Web module instance corresponding to the client request. In some embodiments, the instance does not exist, indicating that the Web component method has not yet been invoked. If the instance exists (i.e., the "Yes" branch from 307), the process proceeds directly to 309. In some embodiments, an instance already exists in the Web module method, indicating that the Web module method has been invoked.

The Web module method generates an instance each time while invoked. The generated instance may be cached and shared (e.g., Web modules of the Web server). Specifically, instances may be registered in a memory unit of the Web server. It is not necessary to re-create the instance in response to same function requests next time. The "same function requests" refers to client requests having the same application functions (e.g., requests submitted by different clients indicate "login"). If one client requests "login" and "order submission" separately, these two requests are different function requests.

At 309, the Web server invokes the Web module method associated with the Web module instance using the request data as an input parameter. The request data may be data that are transformed to the parameter type or the data item found in the Web context.

At 310, the Web server stores the return value in the Web context based on the return parameter annotation. The Web module method automatically generates a return value after invoked. In some embodiments, the return value is the response data associated with the request data and stored in the corresponding scope of the Web context based on a pre-set return parameter declaration.

At 311, the Web server renders the return value of the Web context as a Web page. In some embodiments, efficiency for the Web server processing the client request can be further improved by determining whether the corresponding Web module instance is already stored in the Web server.

Figure 4:
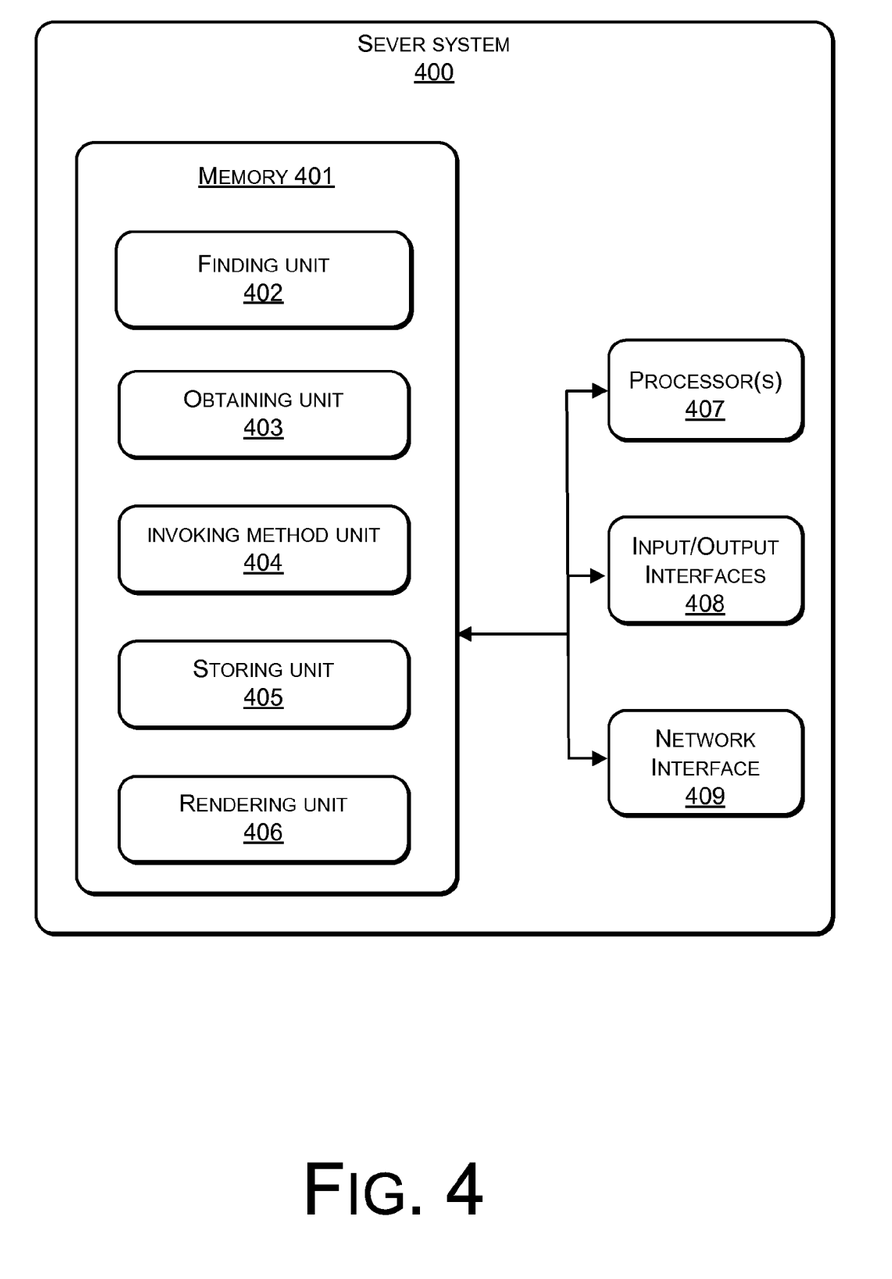
FIG. 4 is a schematic block diagram showing details of an exemplary server system.
Figure 5:
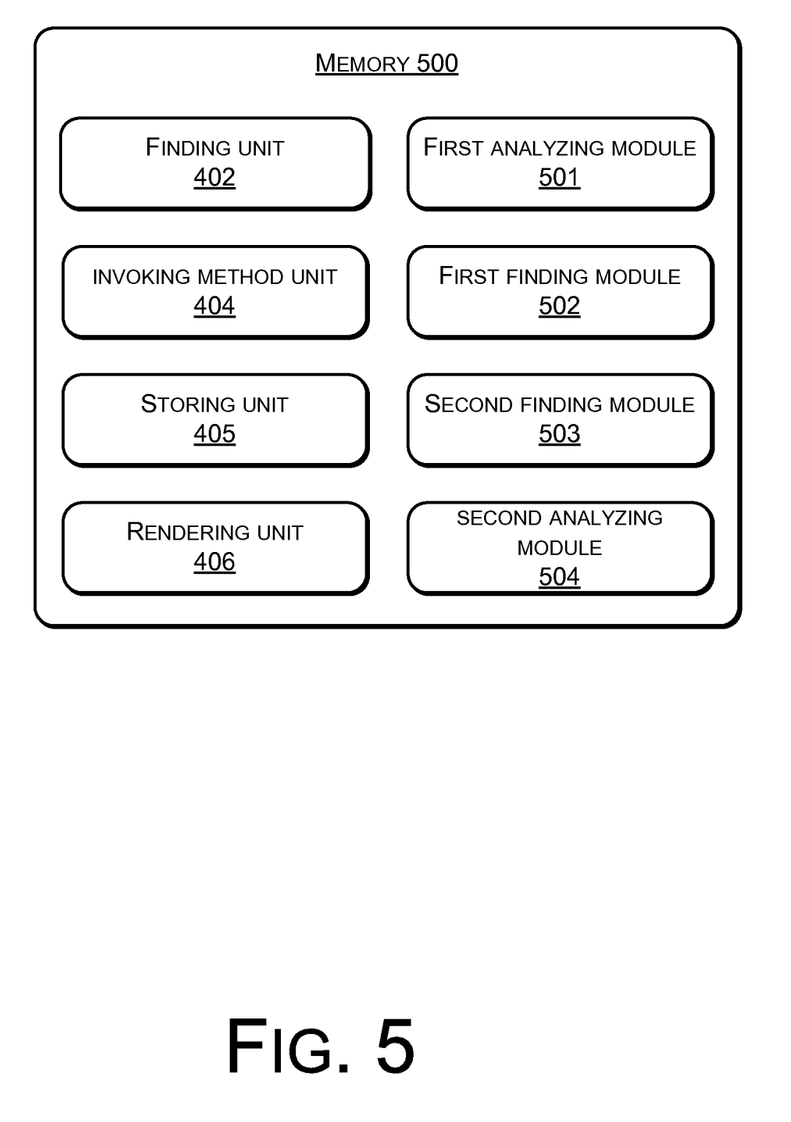
FIG. 5 is a schematic block diagram showing details of an exemplary memory.
Figure 6:
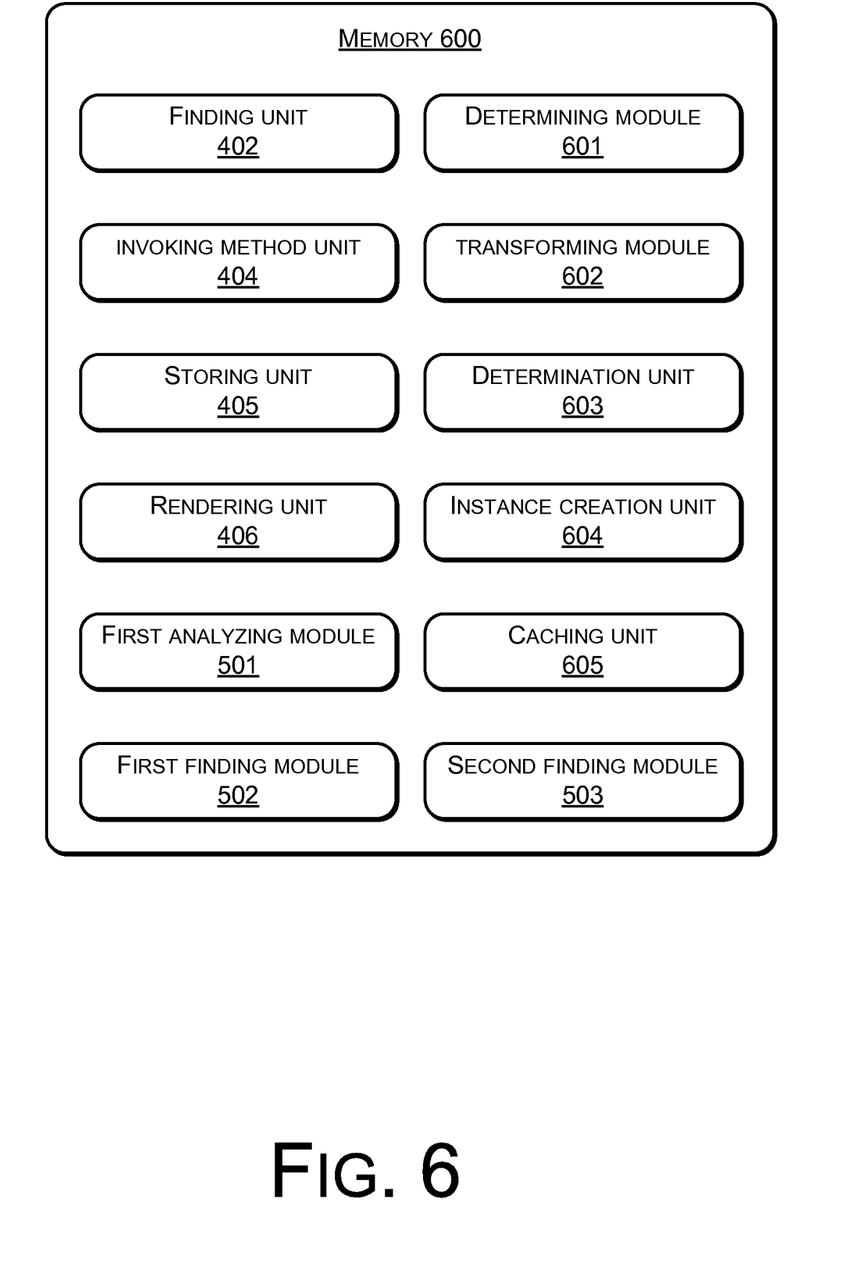
FIG. 6 is a schematic block diagram showing details of another exemplary memory.

FIGS. 4-6 are schematic block diagrams showing details of exemplary server systems and/or memory of the systems. For discussion purposes, the systems and memory are described with reference to the processes 100, 200 and 300 shown in FIGS. 1-3. However, the systems and memory described herein may be used to perform different processes.

FIG. 4 is a schematic block diagram showing details of an exemplary server system 400 for implementing a process, such as the process 100. The server system 400 may be configured as any suitable device. In one exemplary configuration, the computing device 400 includes one or more processors 407, input/output interfaces 408, network interface 409, and memory 401.

The memory 401 may include computer-readable media in the form of volatile memory, such as random-access memory (RAM) and/or non-volatile memory, such as read only memory (ROM) or flash RAM. The memory 401 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 401 in more detail, the memory 401 may store a finding unit 402, an obtaining unit 403, an invoking method unit 404, a storing unit 405, a rendering unit 406, and one or more applications for implementing all or a part of Web access (not shown in FIG. 4). The finding unit 402 finds a Web module and Web module method corresponding to a received client request. Based on a parameter declaration of the Web module method, the obtaining unit 402 obtains request data corresponding to the client request from a Web context. After obtaining the request data, the invoking method unit 403 invokes the Web module method by using the request data as an input parameter of the Web module method. The storing unit 404 stores in the Web context the return value based on a return parameter declaration of the Web module method. Then, the rendering unit 405 renders the return value of the Web context a Web page that is subsequently displayed to the client.

In some embodiments, the pre-set parameter declaration indicates where the request data is located in the Web context, and the pre-set return parameter declaration indicates where a return value after invoking the Web module method is to be located in the Web context. The Web module may process its relevant data based on the parameter declaration of the method and the return parameter declaration. The Web module does not necessarily rely on an instance variant to obtain the request data. A Web container of the Web server may input the request data as the parameter declaration. The Web module may then use the declaration as an input parameter, therefore, reducing processing steps and increasing efficiency and performance of the Web server.

FIG. 5 is a schematic block diagram showing details of an exemplary memory 500 for implementing a process, such as the process 200. The memory 500 may store, similar to the memory 401 of FIG. 4, a finding unit 402, an invoking method unit 404, a storing unit 405, and a rendering unit 406. In this FIG. 5 implementation, the memory 500 further stores a first analyzing module 501, a first finding module 502, a second finding module 503, and a second analyzing module 504.

In some embodiments, the obtaining unit 403 shown in FIG. 4 may include the first analyzing module 501, the first finding module 502, the second finding module 503 and the second analyzing module 504. Accordingly, after finding the Web module and Web module method by the finding unit 401, the first analyzing module 501 analyzes a parameter declaration of the Web module method to obtain a parameter annotation and a parameter annotation attribute. The first finding module 502 finds in the Web context a data scope corresponding to the request data based on the parameter annotation. The second finding module 503 server finds in the data scope of the Web context the data item corresponding to the client request based on the parameter annotation attribute. The second resolving module 504 analyzes the return parameter declaration to obtain a return parameter annotation that indicates a scope of the Web context corresponding to the return value.

FIG. 6 is a schematic block diagram showing details of another exemplary memory 600 for implementing a process, such as the process 300. The memory 600 may store, similar to the memory 500 of FIG. 5, a finding unit 402, an invoking method unit 404, a storing unit 405, a rendering unit 406, a first analyzing module 501, a first finding module 502, a second finding module 503, and a second analyzing module 504. In this FIG. 6 implementation, the memory 600 further stores a determining module 601, a transforming module 602, a determination unit 603, an instance creation unit 604, and a caching unit 605.

In some embodiments, the determining module 601 determines whether the parameter type and an actual type of the request data are consistent. If these two types are inconsistent, the transforming module 602 transforms the request data from the actual type to the parameter type based on a pre-determined rule. If these two types are consistent, the determination unit 603 determines whether an instance exists in the Web component method corresponding to the client request. If the instance does not exist, the instance creation unit 604 generates a Web module instance corresponding to the client request. If the instance exists, the invoking method unit 404 invokes the Web module method associated with the Web module instance using the request data as an input parameter.

It should be noted that in the disclosure, the terms such as "first" and "second" are merely used for distinguishing one entity/operation from another and are not intended to imply or require any physical relationship or order. For ease of understanding, devices are depicted as different units according to their different functions; the functions of different units may be implemented in one or several software/hardware in implementation.

The embodiments in this disclosure are merely for illustrating purposes and are not intended to limit the scope of this disclosure. A person having ordinary skill in the art would be able to make changes and alterations to embodiments provided in this disclosure. Any changes and alterations that persons with ordinary skill in the art would appreciate fall within the scope of this disclosure.

What is claimed is:

1. A method implemented at least partially by a processor, the method comprising:
    finding a Web module method corresponding to a client request;
    obtaining, from a Web context, request data corresponding to the client request based on a predetermined parameter declaration of the Web module method, the predetermined parameter declaration indicating a data source of the request data in the Web context, the Web context being a storage unit of a Web server and including multiple data scopes having respective data visibilities for the Web module method;
    invoking the Web module method by using the request data as an input parameter;
    storing, in the Web context, a return value based on a predetermined return parameter declaration of the Web module method, the predetermined return parameter declaration indicating a data scope of the multiple data scopes that the return value is stored in; and
    rendering a Web page based on the stored return value in the Web context.

2. The method as recited in claim 1, wherein the obtaining comprises:
    analyzing the predetermined parameter declaration to obtain a parameter annotation and a parameter annotation attribute, the parameter annotation indicating the data source of the request data in the Web context, the parameter annotation attribute indicating a data item of the request data in the data source.

3. The method as recited in claim 2, further comprising:
    finding, in the Web context, the data source corresponding to the request data based on the parameter annotation; and
    finding, in the data source, the data item corresponding to the client request based on the parameter annotation attribute.

4. The method as recited in claim 1, further comprising:
    determining that a parameter type in the predetermined parameter declaration and a parameter type associated with the return value are inconsistent; and
    in response to the determining, converting the request data from the parameter type corresponding to the return value to the parameter type in the predetermined parameter declaration based on a pre-determined rule.

5. The method as recited in claim 1, wherein the storing comprises:
    analyzing the predetermined return parameter declaration to obtain a return parameter annotation that indicates the data scope of the Web context associated with the return value; and
    storing, in the scope of the Web context, the return value.

6. The method as recited in claim 1, further comprising:
    determining that the Web module method corresponding to the client request does not include an instance corresponding to the client request, and in response to the determining, generating a Web module instance corresponding to the client request.

7. The method as recited in claim 6, further comprising:
    caching the Web module instance;
    invoking the Web module method based on the Web module instance after receiving another client request.

8. A server system, comprising:
    one or more processors;
    memory that includes a plurality of computer-executable modules, the plurality of computer-executable modules comprising:
        a finding unit configured to find a Web module method of a Web module based on a client request, the Web module method including a predetermined parameter declaration and a predetermined return parameter declaration;
        an obtaining unit configured to obtain, from a Web context, request data corresponding to the client request based on the predetermined parameter declaration, the predetermined parameter declaration indicating a data source of the request data in the Web context, the predetermined return parameter declaration indicating a data scope of the Web context that the return value is stored in;
        an invoking method unit configured to invoke the Web module method based on the request data to generate a return value;
        a storing unit configured to store, in the Web context, the return value based on the predetermined return parameter declaration to generate an updated Web context; and
        a rendering unit configured to render a Web page based on the updated Web context.

9. The server as recited in claim 8, wherein the obtaining unit comprises:
a first analyzing module configured to analyze the predetermined parameter declaration to obtain a parameter annotation and a parameter annotation attribute, the parameter annotation indicating the data source of the request data in the Web context, and the parameter annotation attribute indicating a data item of the request data in the data source.

10. The server as recited in claim 9, wherein the obtaining unit further comprises:
a first determining module configured to determine the data scope including the request data based on the parameter annotation; and
a second determining module configured to determine the data item corresponding to the client request based on the parameter annotation attribute.

11. The server as recited in claim 8, further comprising:
a determination module configured to determining that a parameter type included in the predetermined parameter declaration and a parameter type corresponding to the return value are inconsistent; and
a transforming module configured to transform the request data from the parameter type corresponding to the return value to the parameter type included in the predetermined parameter declaration based on a pre-determined rule.

12. The server as recited in claim 8, further comprising:
a second analyzing module configured to analyze the predetermined return parameter declaration to obtain a return parameter annotation that indicates a scope of the Web context.

13. The server as recited in claim 8, further comprising:
a determination unit configured to determine that the Web module method corresponding to the client request does not include an instance; and
an instance creation unit configured to create a Web module instance corresponding to the client request after the determining.

14. The server as recited in claim 11, further comprising a caching unit configured to:
cache a Web module instance; and
invoke the Web module method using the Web module instance after receiving another client request.

15. One or more computer-readable media encoded with instructions that, when executed by one or more processors, configure the one or more processors to perform acts comprising:
locating a Web module of a Web server and a corresponding Web module method in response to a client request;
determining, based on the corresponding Web module, a pre-set parameter declaration indicating a scope of a Web context that stores request data associated with the client request;
obtaining, from the Web context, the request data based on the pre-set parameter declaration;
invoking the Web module method by using the request data to generate a return value;
updating the Web context by storing the return value based on a return parameter declaration included in the Web module method; and
rendering the return value based on the updated Web context.

16. The one or more computer-readable media as recited in claim 15, wherein the obtaining comprises:
analyzing the parameter declaration to obtain a parameter annotation and a parameter annotation attribute, the parameter annotation indicating a data source of the request data in the Web context, the parameter annotation attribute indicating a data item of the request data in the data source;
determining, in the Web context, a data scope corresponding to the request data based on the parameter annotation; and
determining, in the data scope, the data item corresponding to the client request based on the parameter annotation attribute.

17. The one or more computer-readable media as recited in claim 15, wherein the Web module is a controller of Model-View-Controller (MVC) and the Web module is a function of the controller.

18. The one or more computer-readable media as recited in claim 15, wherein the Web module method is implemented as a hypertext markup language (HTML) or Query String Format.

19. The one or more computer-readable media as recited in claim 15, further comprising:
determining that a parameter type included in the parameter declaration and a parameter type corresponding to the return value are inconsistent, and subsequently converting the request data from the parameter type corresponding to the return value to the parameter type included in the parameter declaration based on a pre-determined rule; and
determining that the Web module method does not include an instance corresponding to the client request, and subsequently generating a Web module instance corresponding to the client request.

20. The one or more computer-readable media as recited in claim 15, further comprising:
analyzing the return parameter declaration to obtain a return parameter annotation that indicates a scope of the Web context associated with the return value; and
storing, in the scope of the Web context, the return value associated with the invoked Web module method.

* * * * *